(12) United States Patent
Iwata et al.

(10) Patent No.: US 10,775,352 B2
(45) Date of Patent: Sep. 15, 2020

(54) COLUMN OVEN

(71) Applicant: Shimadzu Corporation, Kyoto (JP)

(72) Inventors: Yosuke Iwata, Kyoto (JP); Koji Numata, Kyoto (JP); Kei Shimojima, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 5 days.

(21) Appl. No.: 16/210,260

(22) Filed: Dec. 5, 2018

(65) Prior Publication Data
US 2020/0182837 A1    Jun. 11, 2020

(51) Int. Cl.
| | | |
|---|---|---|
| *G01N 30/30* | (2006.01) |
| *G01N 30/38* | (2006.01) |
| *G01N 30/60* | (2006.01) |
| *G01N 30/02* | (2006.01) |
| *G01N 30/20* | (2006.01) |

(52) U.S. Cl.
CPC ......... *G01N 30/6043* (2013.01); *G01N 30/38* (2013.01); *G01N 30/6047* (2013.01); *G01N 30/30* (2013.01); *G01N 2030/027* (2013.01); *G01N 2030/202* (2013.01); *G01N 2030/3007* (2013.01); *G01N 2030/3084* (2013.01)

(58) Field of Classification Search
CPC ............... G01N 30/6043; G01N 30/38; G01N 30/6047; G01N 30/30; G01N 30/88; G01N 30/6052; G01N 30/6091; G01N 30/54; G01N 2030/027; G01N 2030/3007; G01N 2030/3084; G01N 2030/8881; G01N 2030/8804; G01N 2030/524; G01N 2030/025; G01N 2030/202

See application file for complete search history.

(56) References Cited

U.S. PATENT DOCUMENTS

| | | | | |
|---|---|---|---|---|
| 4,321,138 A * | 3/1982 | Ito | ........................ | G01N 30/42 |
| | | | | 210/198.2 |
| 5,405,534 A * | 4/1995 | Ishida | ................ | B01D 15/1828 |
| | | | | 210/662 |
| 5,892,458 A * | 4/1999 | Anderer | ................. | G01N 30/88 |
| | | | | 340/10.41 |
| 6,017,451 A * | 1/2000 | Kopf | .................... | B01D 29/118 |
| | | | | 210/232 |
| 2010/0025331 A1* | 2/2010 | Cabrera Perez | ....... | B01D 15/22 |
| | | | | 210/656 |
| 2011/0167898 A1* | 7/2011 | Zhou | ...................... | G01N 30/24 |
| | | | | 73/61.55 |
| 2014/0043018 A1* | 2/2014 | Hochgraeber | ......... | G01N 30/26 |
| | | | | 324/207.2 |

(Continued)

FOREIGN PATENT DOCUMENTS

JP    2015-45532 A    3/2015

*Primary Examiner* — Benjamin L Lebron
(74) *Attorney, Agent, or Firm* — Maier & Maier, PLLC

(57) ABSTRACT

To diminish complication and difficulty in attachment and detachment of analytical columns to and from a column oven. The column oven includes, in a column housing part that includes a space for housing the plurality of analytical columns, a column rack that holds the plurality of analytical columns, an inlet switching valve, and an outlet connection portion. At least either the inlet switching valve or the outlet connection portion is formed integrally with the column rack and capable of being attached to and detached from the column housing part together with the column rack.

8 Claims, 11 Drawing Sheets

(56) References Cited

U.S. PATENT DOCUMENTS

2015/0059450 A1     3/2015   Takahashi
2015/0285769 A1*   10/2015   Matsuoka .............. G01N 30/54
                                                             73/23.39

* cited by examiner

COLUMN OVEN

FIELD

The present invention relates to a column oven for housing an analytical column for liquid chromatography and maintaining the analytical column at a constant temperature, and particularly, to a column oven for housing a plurality of columns.

BACKGROUND

In the liquid chromatography, analytical columns are used for quantitative and/or qualitative analysis of sample components. In general, the analytical columns are housed in a column oven and adjusted to a constant temperature (see Patent Document 1). In method scouting for searching for an analytical column suitable for a sample or when a column manufacturer performs a quality inspection of analytical columns, a column oven capable of housing a plurality of analytical columns is used and the plurality of analytical columns are disposed in the column oven.

A flow path switching valve for switching between the analytical columns to be used is provided on an upstream side of the analytical columns in the column oven, and the flow path switching valve is switched to thereby select the analytical column to be used for the analysis.

Patent Document 1: Japanese Patent Laid-open Publication No. 2015-045532

SUMMARY

Each of the analytical columns is mounted to and dismounted from the column oven, which houses the plurality of analytical columns as described above, by attaching and detaching pipes to and from opposite ends of the respective analytical columns. Therefore, the larger the number of analytical columns to be attached and detached, the more the attachment and the detachment become complicated. For example, to attach and detach twelve analytical columns to and from the column oven, it is necessary to attach and detach twenty-four portions of the pipes. As a result, it takes a long time to attach and detach the analytical columns. The time, which could otherwise be used for the analysis, is wasted. Moreover, if the pipes are attached and detached one by one to and from the analytical columns, the analytical columns corresponding to respective connection ports of the flow path switching valve may be mixed up with each other and connected incorrectly and a chance of making a piping mistake increases.

Moreover, the analytical columns need to be attached and detached to and from the column oven in the column oven or while pulled out from the column oven to a degree allowed by slack in the piping. However, because the column oven has a narrow inner space and the degree of pulling out of the analytical columns allowed by the slack in the piping is limited, it is not easy to install the piping to the analytical columns in many cases.

Therefore, it is an object of the present invention to diminish complication and difficulty in attachment and detachment of analytical columns to and from a column oven.

A column oven according to the present invention includes: an inlet pipe; an outlet pipe; a column housing part including a space for housing a plurality of analytical columns therein; a column rack including a column holding portion for holding the plurality of analytical columns and is detachably disposed in the column housing part; an inlet switching valve provided in the space of the column housing part, the inlet switching valve includes an inlet port to which the inlet pipe is connected and a plurality of column inlet connection ports to which respective inlets of the plurality of analytical columns held by the column rack are connected, the inlet switching valve selects one column inlet connection port among the plurality of column inlet connection ports to connect the inlet port to the selected column inlet connection port; and; and an outlet connection portion provided in the space of the column housing part, the outlet connection portion includes a plurality of column outlet connection ports to which respective outlets of the plurality of analytical columns held by the column rack are connected and an outlet port to which the outlet pipe is connected, and the outlet connection portion connects the analytical column connected to the inlet pipe to the outlet pipe. At least one of the inlet switching valve and the outlet connection portion is formed integrally with the column rack and capable of being attached to and detached from the column housing part together with the column rack.

Preferably, both the inlet switching valve and the outlet connection portion are formed integrally with the column rack and are capable of being attached to and detached from the column housing part together with the column rack. In this way, to attach and detach the plurality of analytical columns, it is only necessary to attach and detach the pipe of the inlet port of the inlet switching valve and the pipe of the outlet port of the outlet connection portion to complete the attachment and the detachment of the plurality of analytical columns to and from the inlet pipe and the outlet pipe. Therefore, it is unnecessary to attach and detach the pipes to the inlet and the outlet of each of the analytical columns in the column housing part, which greatly diminishes complication and difficulty in the attachment and the detachment of the columns to and from the column oven.

The column housing part has a window capable of being opened and closed and the analytical columns and the column rack are attached and detached through the window. To replace only part of the analytical columns out of the plurality of analytical columns held by the column rack, the attachment and the detachment are difficult depending on positions where the analytical columns are disposed. Therefore, the column rack preferably has a sliding mechanism shich slide the analytical columns held by the column rack toward the window. By sliding the analytical columns toward the window, it is easy to install piping to the analytical columns with the column rack installed in the column housing part.

The column rack may comprise a support shaft extending from a side of the inlet switching valve toward the outlet connection portion and hold the analytical columns oriented parallel to the support shaft and arranged on a circumference centered at the support shaft. In a case where the large number of analytical columns are housed in the column housing part, if the analytical columns are disposed in rows in the column housing part, a large space is necessary for the column housing part and an entire column oven becomes large. If the analytical columns are arranged on the circumference, on the other hand, an increase in footprint is suppressed, which contributes to miniaturization of the column oven.

The column rack may hold the analytical columns held by the column holding portion so that the analytical columns can turn in a direction of the circumference centered at the support shaft. In this way, to take out only part of the analytical columns out of the analytical columns held by the column rack, the analytical columns to be taken out can be moved to a position, where piping work can be carried out easily, by turning the analytical columns. As a result, it is easy to install the piping to the analytical columns with the column rack installed in the column housing part.

In the above-described case, if the analytical columns are turned with the column inlet connection ports and the column outlet connection ports of the inlet switching valve and the outlet connection portion are fixed in the positions, pipes respectively connecting the inlets and outlets of the analytical columns to the column inlet connection ports and the column outlet connection ports twist. Therefore, both the inlet switching valve and the outlet connection portion are preferably configured so that the column inlet connection ports and the column outlet connection ports rotate in the direction of the circumference in synchronization with the turning of the analytical columns on the column rack. In this way, the pipes do not twist when the analytical columns turn.

According to a preferable embodiment in the above-described case, both the inlet switching valve and the outlet connection portion are rotary switching valves respectively for selectively switching between the column inlet connection ports to be connected to the inlet port and between the column outlet connection ports to be connected to the outlet port respectively by rotation of the column inlet connection ports and the column outlet connection ports.

In the above-described case, preferably, the column holding portion turns and the column inlet connection ports and the column outlet connection ports rotate as the support shaft rotates. In this way, the column holding portion, the column inlet connection ports, and the column outlet connection ports can be driven for rotation by driving the support shaft for rotation. Therefore, a single drive mechanism can be shared, which results in cost reduction.

In the column oven according to the present invention, at least either the inlet switching valve or the outlet connection portion is formed integrally with the column rack and capable of being attached to and detached from the column housing part together with the column rack. Therefore, in attaching and detaching the plurality of analytical columns, it is only necessary to attach and detach the pipe of the inlet port of the inlet switching valve or the pipe of the outlet port of the outlet connection portion to complete connection of the inlet pipe or the outlet pipe to the inlets or the outlets of the analytical columns on at least one of the inlet sides and the outlet sides of the analytical columns, and it is possible to attach and detach the analytical columns to and from the column oven together with the column rack. Because the analytical columns can be attached to and detached from the column rack outside the column oven on at least either the inlet sides or the outlet sides of the analytical columns, it is possible to diminish complication and difficulty in the piping work in the attachment and the detachment of the plurality of analytical columns to and from the column oven.

DETAILED DESCRIPTION

An embodiment of a column oven will be described by using FIGS. 1 to 7.

Figure 1:
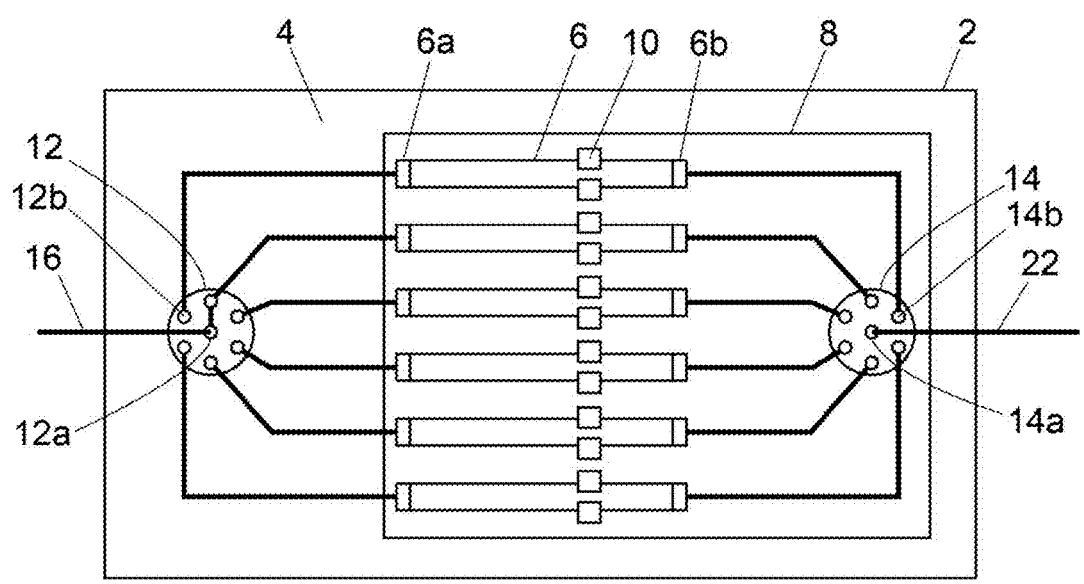
FIG. 1 is a configuration diagram schematically showing an embodiment of a column oven.

As shown in FIG. 1, the column oven 2 in the embodiment has a column housing part 4 that includes a space for housing a plurality of analytical columns 6 inside itself. The analytical columns 6 are held by column holding portions 10 of a column rack 8. Inlets 6a of the respective analytical columns 6 are connected to column inlet connection ports 12b of respective inlet switching valves 12 by pipes and outlets 6b of the respective analytical columns 6 are connected to outlet-side connection portions 14 by pipes.

An inlet pipe 16 is connected to an inlet port 12a of each of the inlet switching valves 12. The inlet pipe 16 is connected to an external device (e.g., an autosampler) through a pipe insert hole or a slit, and a mobile phase is introduced into the column oven 2. Each of the inlet switching valves 12 is a rotary switching valve for switching between the column inlet connection ports 12b to selectively connect the inlet port 12a to one of the column inlet connection ports 12b.

An outlet pipe 22 is connected to an outlet port 14a of each of the outlet-side connection portions 14. The outlet pipe 22 is connected to an external device (e.g., a detector) through a pipe insert hole or a slit and the mobile phase flowing through any of the analytical columns 6 is sent toward the external device via the outlet pipe 22.

Each of the outlet-side connection portions 14 may be a manifold formed so that respective column outlet connection ports 14b are kept communicating with the common outlet port 14a or may be a switching valve for switching between the column outlet connection ports 14b and selectively connect the outlet port 14a to one of the column outlet connection ports 14b similarly to the inlet switching valve 12. If each of the outlet-side connection portions 14 is the switching valve, each of the inlet switching valves 12 and each of the outlet-side connection portions 14 are switched in synchronization with each other so that the inlet 6a and the outlet 6b of the one analytical column 6 are connected to the inlet pipe 16 and the outlet pipe 22.

Figure 2:
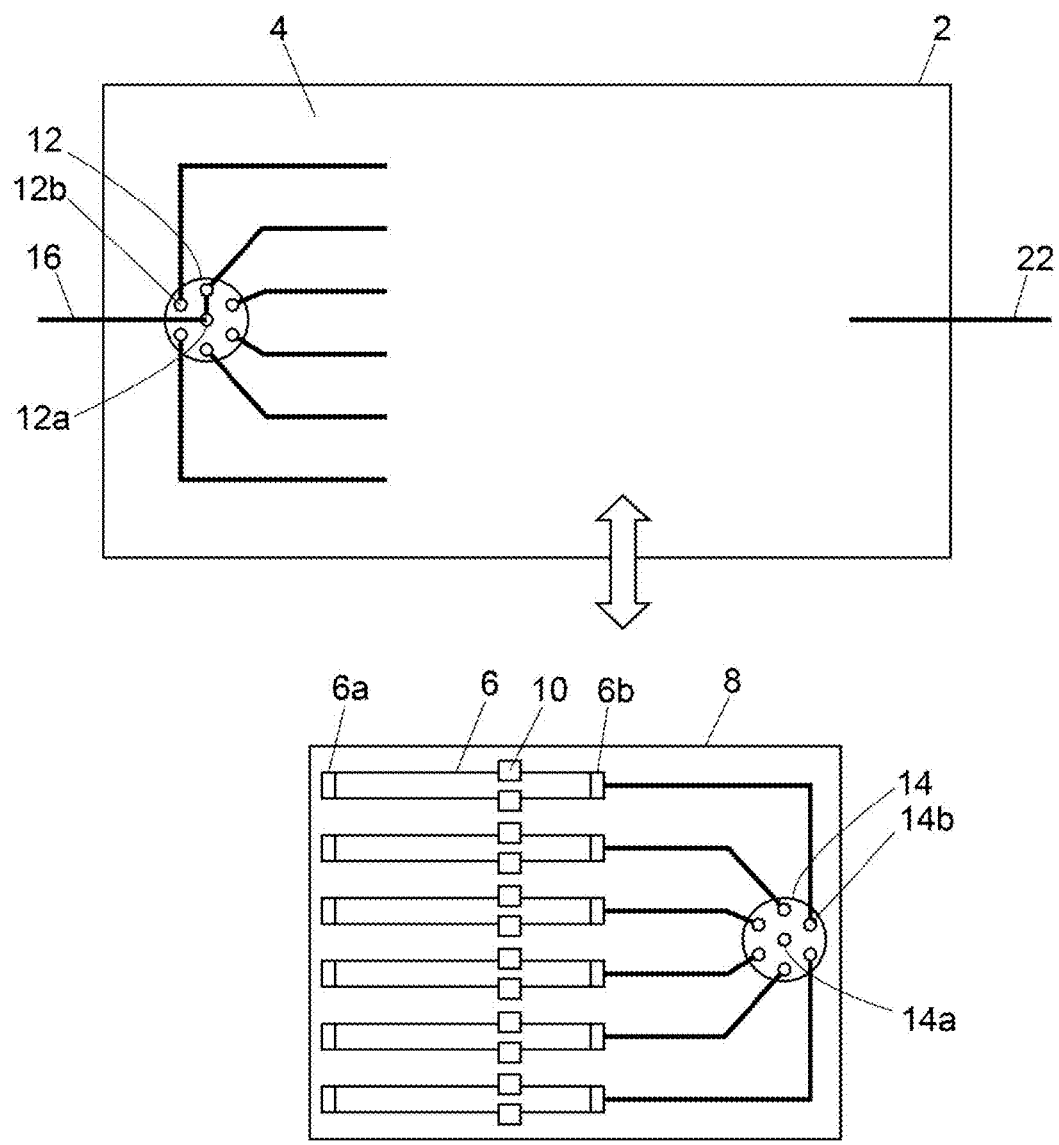
FIG. 2 is a configuration diagram schematically showing a state in which a column rack is taken out of the column oven in the embodiment.

The column rack 8 can be attached to and detached from the column oven 2. The outlet-side connection portions 14 are fixed to the column rack 8. In this way, to attach and detach the analytical columns 6 to and from the column oven 2, it is possible to attach and detach the column rack 8 having the plurality of analytical columns 6 and the outlet-side connection portions 14 as shown in FIG. 2. Because the outlet-side connection portions 14 are also attached to and detached from the column oven 2 together with the analytical columns 6, it is possible to attach and detach the pipes to and from the outlets 6b of the analytical columns 6 outside the column oven 2.

Figure 3:
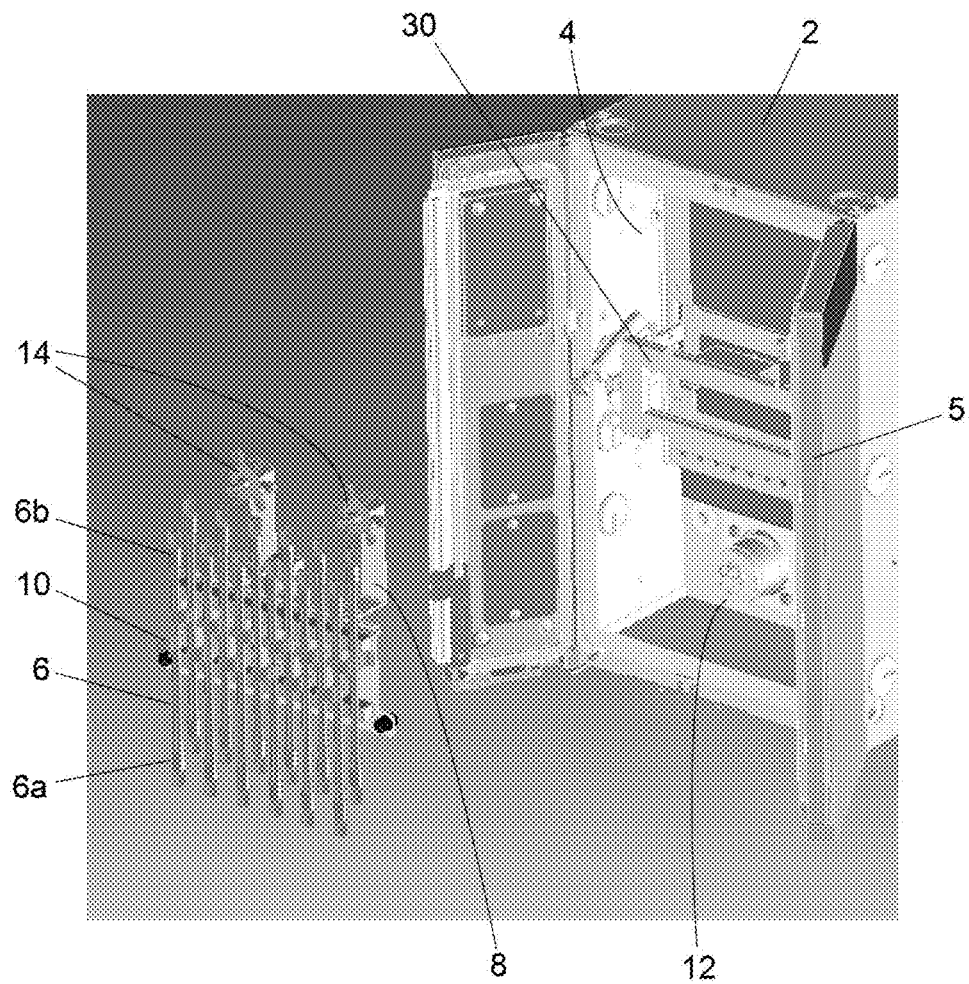
FIG. 3 is a perspective view of the taken-out column rack more specifically showing the configuration of the embodiment.
Figure 4:
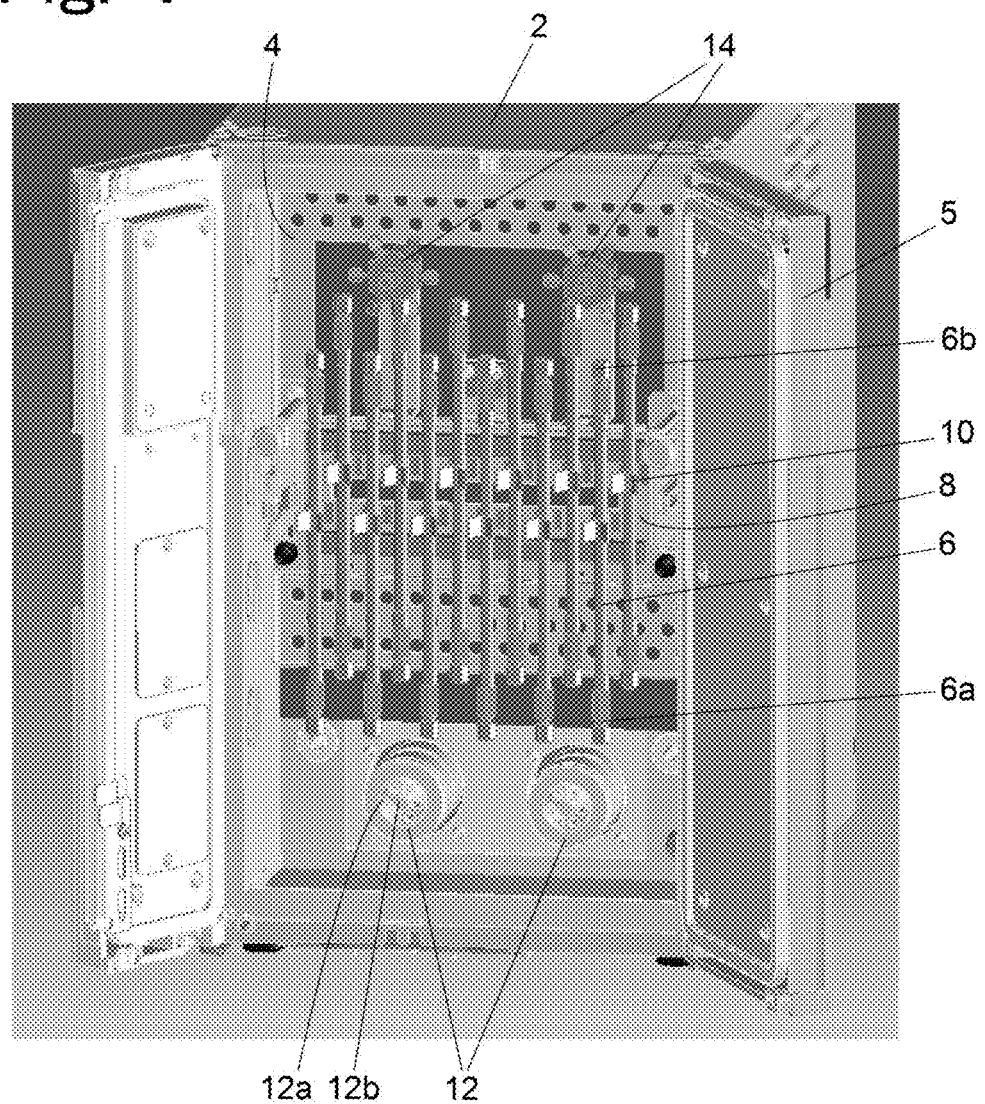
FIG. 4 is a perspective view of the installed column rack more specifically showing the configuration of the embodiment.

A more specific configuration of the column oven 2 in the embodiment will be described by using FIGS. 3 and 4.

The column housing part 4 of the column oven 2 comprises a window that can be opened and closed by doors 5 and the column rack 8 is installed in and detached from the column housing part 4 through the window. In the column housing part 4, a rack holder 30 where the column rack 8 is installed is provided. In the embodiment shown in FIGS. 3 and 4, the column rack 8 can hold the twelve analytical columns 6 in two rows. The analytical columns 6 have the inlets 6a at lower ends and the outlets 6b at upper ends. Each of the column holding portions 10 of the column rack 8 holds each of the analytical columns 6 by pinching the analytical column 6 between two flat springs (see FIG. 5).

In the column housing part 4, the two inlet switching valves 12 are provided. Each of the inlet switching valves 12 is a six-port valve, and the inlets 6a of the six analytical columns 6 are connected to each of the inlet switching valves 12 by the pipes. The number of outlet-side connection portions 14 provided is also two. Each of the outlet-side connection portions 14 has the six column outlet connection ports 14b and forms the manifold with the column outlet connection ports 14 kept communicating with the common outlet port 14a. The column rack 8 is also provided with a manifold 15 (see FIG. 5) for merging the outlet ports 14b of the two outlet-side connection portions 14. Therefore, although the outlet pipe 22 is illustrated as being directly connected to the outlet port 14b of the outlet-side connection portion 14 in FIGS. 1 and 2, the manifold 15 is actually provided between the outlet-side connection portion 14 and the outlet pipe 22. The manifold 15 is not absolutely necessary.

Figure 5:
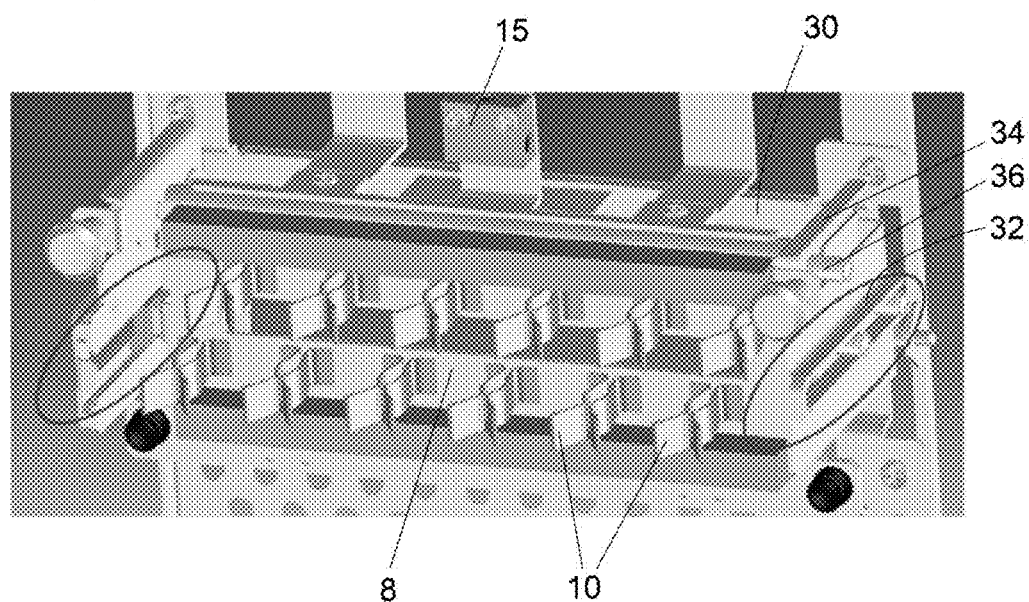
FIG. 5 is a perspective view showing a sliding mechanism of the embodiment.
Figure 6:
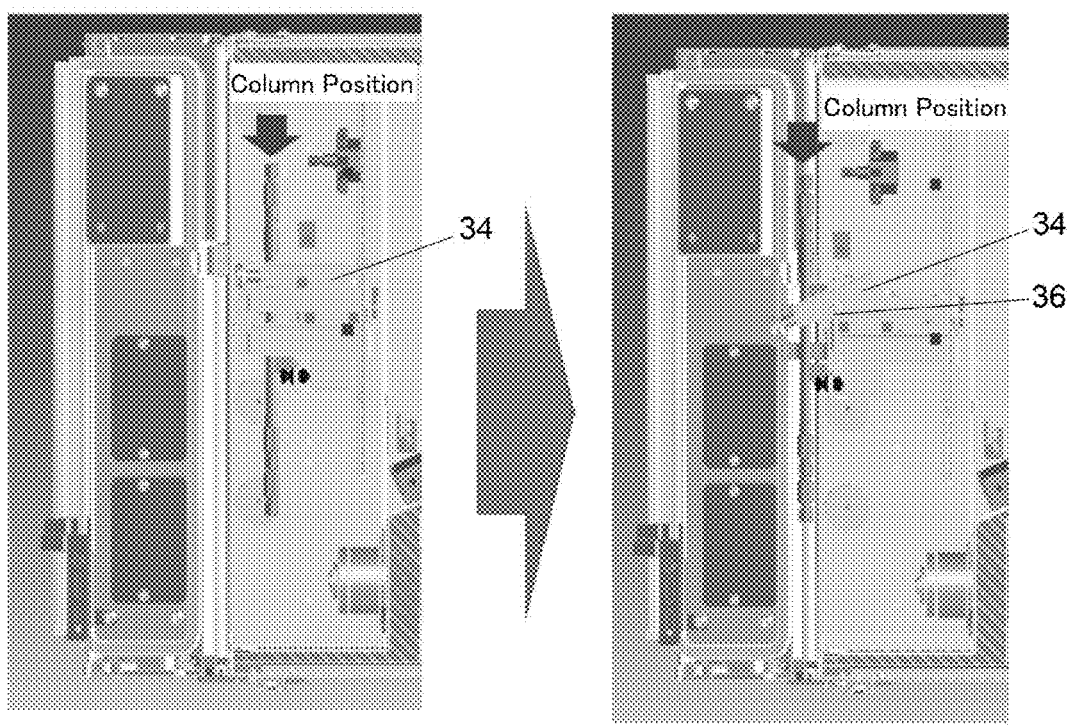
FIG. 6 is a view of the column rack placed in a normal position (on a left side in FIG. 6) and the column rack pulled out toward a window portion (on a right side in FIG. 6) by the sliding mechanism.
Figure 7:
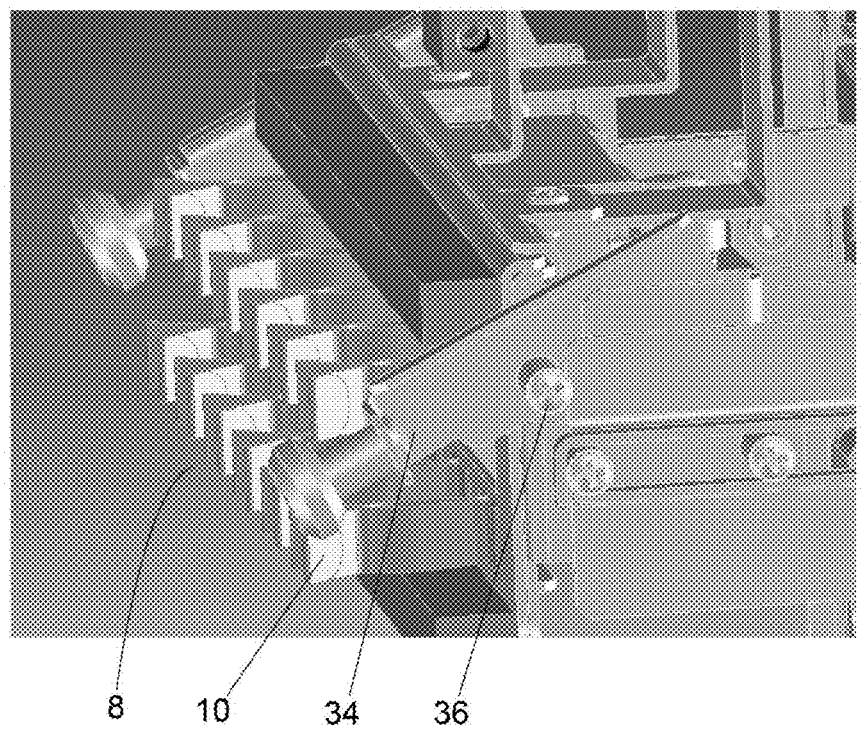
FIG. 7 is a perspective view of a lock mechanism in the embodiment.

As shown in FIGS. 5 to 7, the rack holder 30 in the column housing part 4 has a sliding mechanism 32 for sliding the installed column rack 8 toward the window of the column housing part 4. The sliding mechanism 32 includes guide rails provided to the rack holder 30 and sliding members that are provided to the column rack 8 and slide along the guide rails. Furthermore, the sliding mechanism 32 has a lock mechanism 34 for fixing the column rack 8 in a state in which the column rack 8 is slid toward the window. The lock mechanism 34 moves with the column rack 8 and turns downward when the column rack 8 is pulled out to a predetermined position and protrusions 36 protruding sideways (toward a near side in FIG. 7) become engaged with side face members of the column holder 30. As a result, the column rack 8 is fixed in the pulled-out state (state in FIG. 7).

With the sliding mechanism 32, for partial replacement of the analytical columns 6, it is possible to pull out the column rack 8 to a position, where piping work can be carried out easily, without detaching the column rack 8 from the column oven 2. By fixing the column rack 8 in the pulled-out state with the lock mechanism 34, it is possible to easily carry out the piping work in the position.

Figure 8:
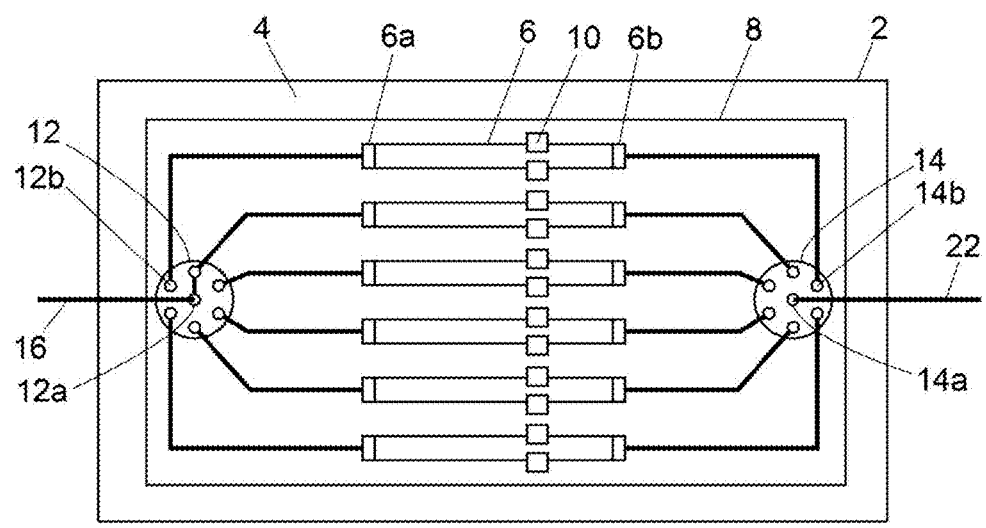
FIG. 8 is a configuration diagram schematically showing another embodiment of the column oven.
Figure 9:
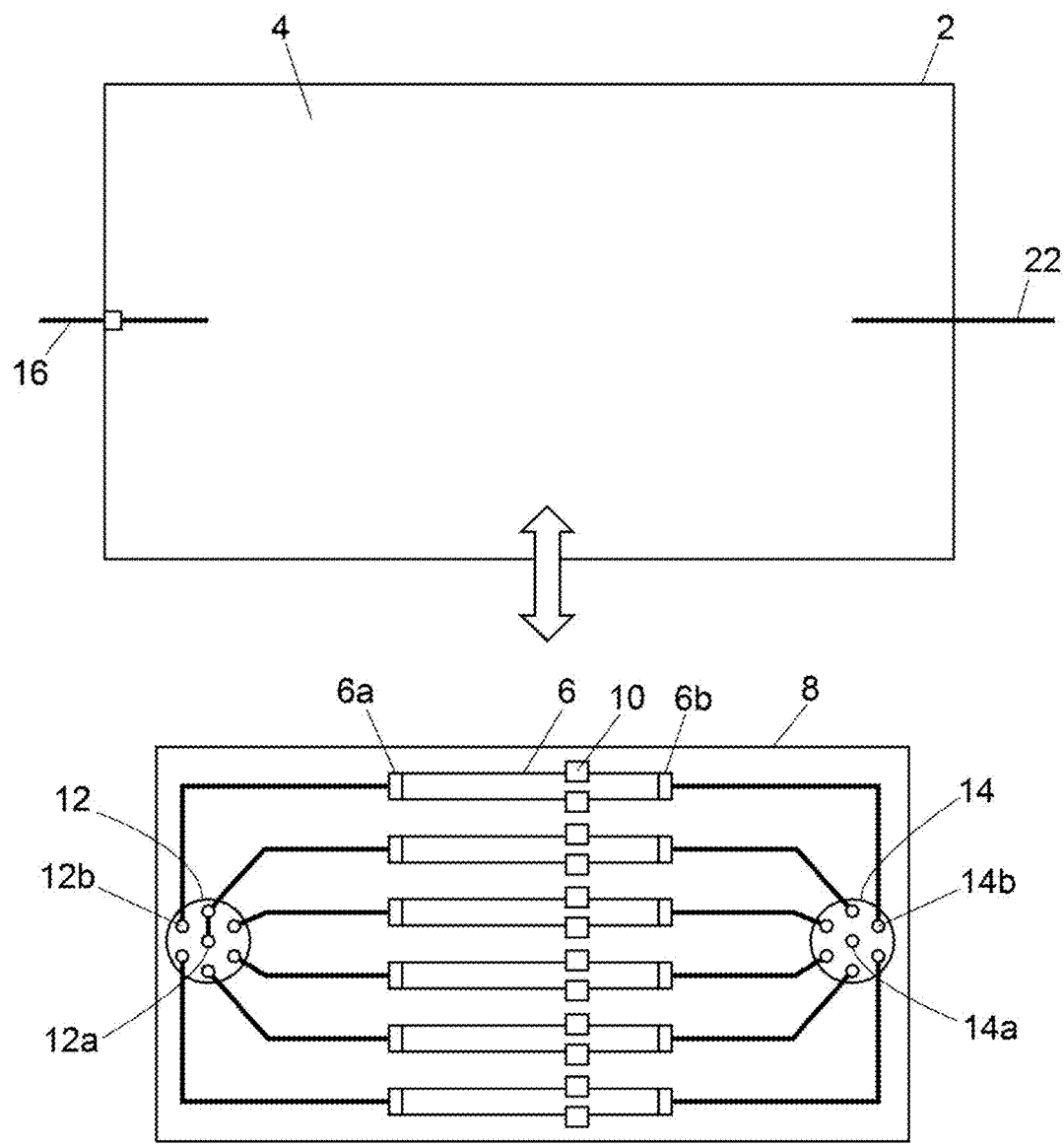
FIG. 9 is a configuration diagram schematically showing a column rack taken out of the column oven in the embodiment.

Next, another embodiment of the column oven will be described by using FIGS. 8 and 9. In the following description, the same portions as those in the above-described embodiment will be provided with the same reference signs and will not be described.

In the present embodiment, inlet switching valves 12 are also fixed to a column rack 8. In other words, the inlet switching valves 12 and outlet-side connection portions 14 can be attached to and detached from the column oven 2 together with a plurality of analytical columns 6. In this way, in attaching and detaching the analytical columns 6 to and from the column oven 2, it is possible to install piping to inlets 6a and outlets 6b of the analytical columns 6 outside the column oven 2.

Figure 10:
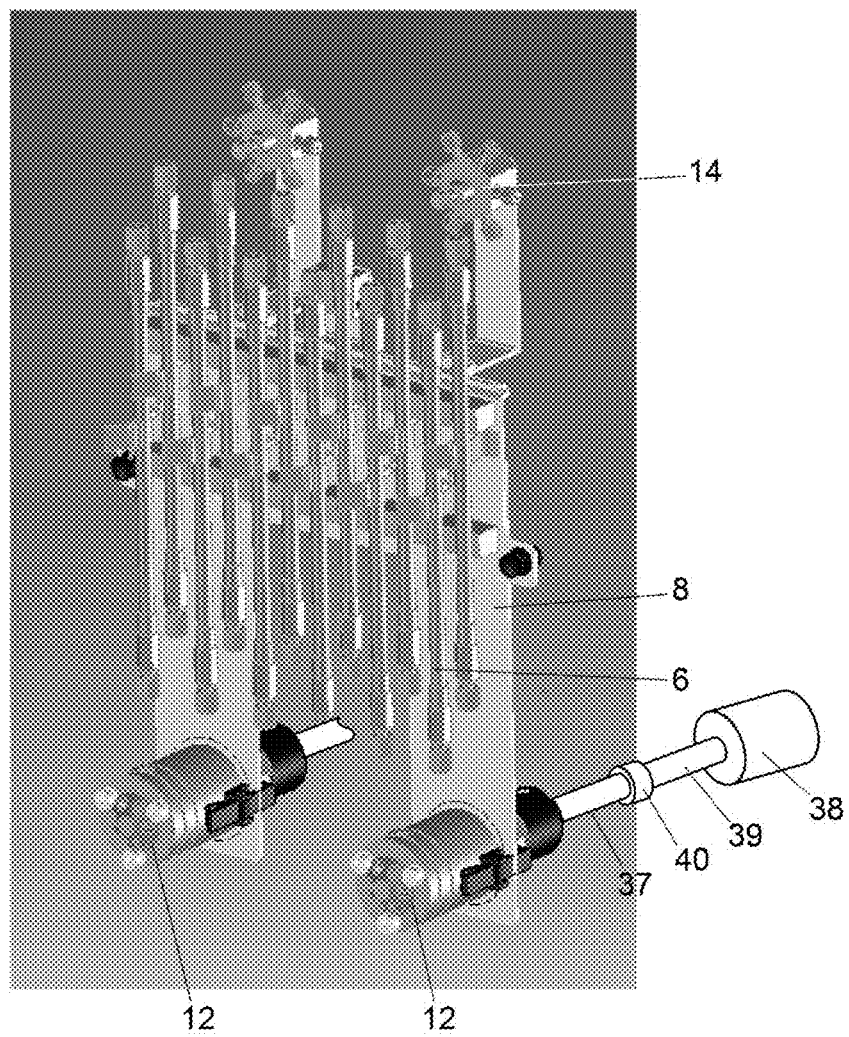
FIG. 10 is a more specific perspective view of the column rack in the embodiment.

A specific configuration of the embodiment will be described by using FIG. 10.

As in the embodiment described by use of FIGS. 3 to 7, the column rack 8 can hold the twelve analytical columns 6. The two inlet switching valves 12 are fixed to the column rack 8. Each of the inlet switching valves 12 is a rotary switching valve and switches between column inlet connection ports 12b (see FIG. 8) to be connected to an inlet port 12a (see FIG. 8) by rotating a rotor with a motor 38.

Drive motors 38 for driving the respective inlet switching valves 12 are provided to the column oven 2. Therefore, a drive shaft 37 for driving the rotor of each of the inlet switching valves 12 and a rotating shaft 39 of each of the drive motors 38 are detachably coupled by a coupling 40. To detach the column rack 8 from the column oven 2, the drive shafts 37 and the rotating shafts 39 connected by the coupling 40 are disconnected from each other and the inlet switching valve 12 is cut off from the drive motor 38. On the other hand, to install the column rack 8 in the column oven 2, the drive shaft 37 and the rotating shaft 39 are connected by the coupling 40.

In the embodiment, the outlet-side connection portions 14 are the manifolds, and therefore, drive mechanisms are not provided. However, if each of the outlet-side connection portions 14 is a rotary switching valve similar to the inlet switching valve 12, it is necessary to carry out connection/disconnection of shafts with a coupling in attaching and detaching the column rack 8 to and from the column oven 2 as in the case of the inlet switching valve 12.

Although the plurality of analytical columns 6 are arranged planarly and disposed on the column rack 8 in the above-described embodiments, it is possible to arrange analytical columns 6 on a circumference in order to reduce a footprint of the column rack 8.

Figure 11:
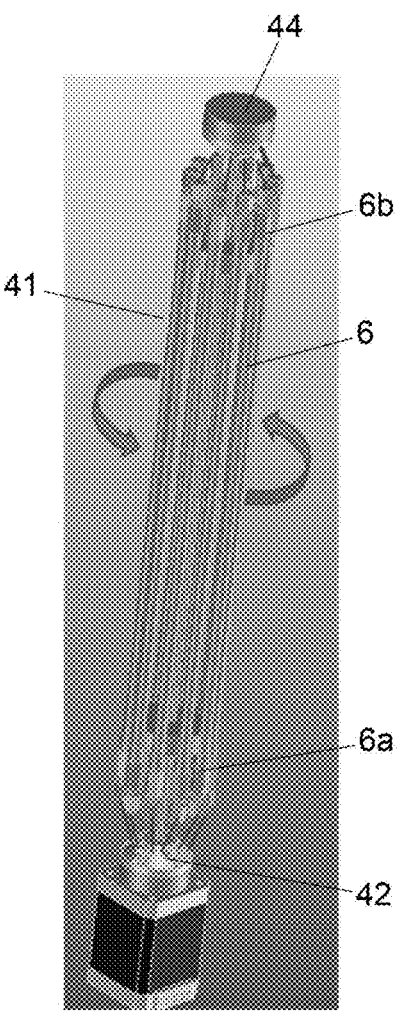
FIG. 11 is a perspective view of a column rack showing yet another embodiment of the column oven.
Figure 12:
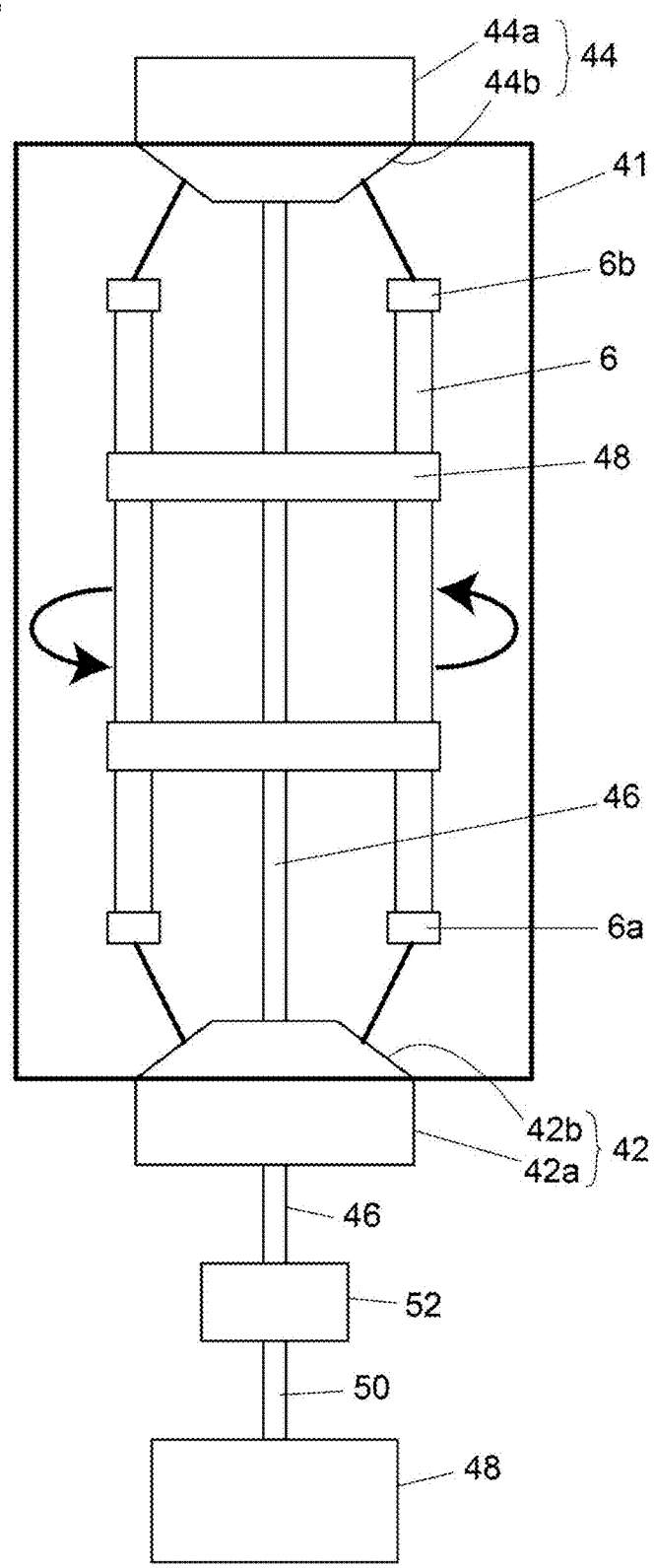
FIG. 12 is a schematic front view of a configuration of the column rack in the embodiment.

FIGS. 11 and 12 show an embodiment of a column rack 41 for holding analytical columns 6 arranged on a circumference.

In the present embodiment, the analytical columns 6 are held while arranged on the same circumference, and an inlet switching valve 42 to which inlets 6a of the respective analytical columns 6 are connected by pipes and an outlet-side connection portion 44 to which outlets 6b of the respective analytical columns 6 are connected by pipes are also provided to the column rack 41.

Both the inlet switching valve 42 and the outlet-side connection portion 44 are rotary switching valves. The column rack 41 has a support shaft 46 coupled to a rotating shaft 50 of a drive motor 48 by a coupling 52, and column holding portions 48 for holding the column rack 6 are fixed to the support shaft 46. The respective analytical columns 6 are disposed parallel to the support shaft 46 and turn around the support shaft 46 as the support shaft 46 rotates.

The inlet switching valve 42 is formed by a stator 42a and a rotor 42b, and ports to which the pipes from the inlets 6a of the analytical columns 6 are connected are provided to the rotor 42b. The rotor 42b is fixed to the support shaft 46 and rotates as the support shaft 46 rotates. On the other hand, the stator 42a does not rotate when the support shaft 46 rotates. Although it is not shown in FIGS. 11 and 12, an inlet pipe is connected to the stator 42a and the rotor 42b rotates to thereby selectively switch between the analytical columns 6 to be connected to the inlet pipe.

Similarly, the outlet-side connection portion 44 is formed by a stator 44a and a rotor 44b, and ports to which the pipes from the outlets 6b of the analytical columns 6 are connected are provided to the rotor 44b. The rotor 44b is fixed to the support shaft 46 and rotates as the support shaft 46 rotates. On the other hand, the stator 44a does not rotate when the support shaft 46 rotates. Although it is not shown in FIGS. 11 and 12, an outlet pipe is connected to the stator 44a, and the rotor 44b rotates to thereby selectively switch between the analytical columns 6 to be connected to the outlet pipe.

Figure 13:
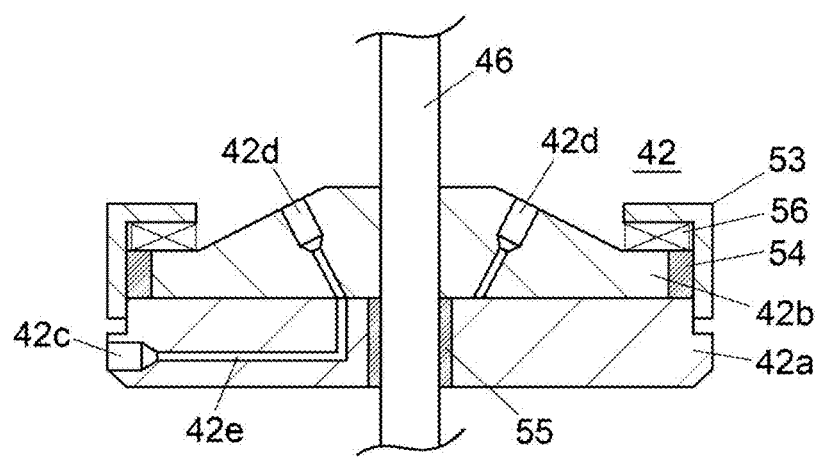
FIG. 13 is a sectional view of a configuration of a switching valve for realizing the column rack in the embodiment.

An example of the configuration of the rotary switching valve for realizing the above-described configuration is shown in FIG. 13. Although only the inlet switching valve 42 is described here, the outlet-side connection portion 44 is configured similarly.

The stator 42a and the rotor 42b are coupled by a coupling member 53 to be able to slide with respect to each other. The coupling member 53 is a ring-shaped member having an upper end extending toward a center and a lower end mounted to an outer peripheral face of the stator 42a by engagement of threads, for example. The upper end of the coupling member 53 is positioned above a peripheral edge of the rotor 42b, and a spring 56 in a compressed state is disposed between the upper end portion of the coupling member 53 and the peripheral edge portion of the rotor 42b. The spring 56 biases the rotor 42b toward the stator 42a. A bearing 54 is provided between an outer peripheral face of the rotor 42b and an inner peripheral face of the coupling member 53. The support shaft 46 passes through a center of the rotor 42b, and the rotor 42b is fixed to the support shaft 46 and rotates with the support shaft 46.

A bearing 55 is provided between the stator 42a and the support shaft 46, and the stator 42a does not rotate when the support shaft 46 rotates. The column inlet connection ports 42d to which the pipes from the inlets 6a of the analytical columns 6 are connected are provided to the rotor 42b, and an inlet port 42c to which the inlet pipe is connected and a flow path 42e communicating with the inlet port 42c are provided to the stator 42a. In this way, the column inlet connection ports 42d move as the analytical columns 6 turn around the support shaft 46, and therefore, positional relationships between the analytical columns 6 and the column inlet connection ports 42d do not change, and twists of the pipes from the inlets 6a are prevented.

With the above-described configuration, it is possible to move the analytical columns 6 in the circumferential direction. As a result, while the column rack 41 is disposed in the column oven, it is possible to move the desired analytical column 6 to a position, where the piping work can be carried out easily, to perform replacement or the like of the analytical column 6.

The invention claimed is:

1. A column oven comprising:
    an inlet pipe;
    an outlet pipe;
    a column housing part including a space for housing a plurality of analytical columns therein;
    a column rack including a column holding portion for holding the plurality of analytical columns, and detachably disposed in the column housing part;
    an inlet switching valve provided in the space of the column housing part, the inlet switching valve includes an inlet port to which the inlet pipe is connected and a plurality of column inlet connection ports to which respective inlets of the plurality of analytical columns held by the column rack are connected, the inlet switching valve selects one column inlet connection port among the plurality of column inlet connection ports to connect the inlet port to the selected column inlet connection port, said one column inlet connection port among the plurality of column inlet connection ports being connected to one analytical column among the plurality of analytical columns; and
    an outlet connection portion provided in the space of the column housing part, the outlet connection portion includes a plurality of column outlet connection ports to which respective outlets of the plurality of analytical columns held by the column rack are connected and an outlet port to which the outlet pipe is connected, and the outlet connection portion connecting the one analytical column to the outlet pipe,
    wherein at least one of the inlet switching valve and the outlet connection portion is formed integrally with the column rack and capable of being attached to and detached from the column housing part together with the column rack.

2. The column oven according to claim 1, wherein both the inlet switching valve and the outlet connection portion are formed integrally with the column rack and capable of being attached to and detached from the column housing part together with the column rack.

3. The column oven according to claim 1, wherein
    the column housing part has a window capable of being opened and closed and
    the column rack has a sliding mechanism which slides the analytical columns held by the column rack toward the window.

4. The column oven according to claim 1, wherein the column rack comprises a central support shaft extending from a side of the inlet switching valve toward the outlet connection portion, and wherein the column rack holds the analytical columns oriented parallel to the support shaft and arranged on a circumference of the column rack the central support shaft.

5. The column oven according to claim 4, wherein the column rack holds the analytical columns held by the column holding portion so that the analytical columns can turn in a direction of the circumference of the column rack surrounding the central support shaft.

6. The column oven according to claim 5, wherein both the inlet switching valve and the outlet connection portion are configured so that the column inlet connection ports and the column outlet connection ports rotate in the direction of the circumference of the column rack in synchronization with the turning of the analytical columns on the column rack.

7. The column oven according to claim 6, wherein both the inlet switching valve and the outlet connection portion are rotary switching valves respectively for selectively switching between the column inlet connection ports to be connected to the inlet port and between the column outlet connection ports to be connected to the outlet port respectively by rotation of the column inlet connection ports and the column outlet connection ports.

8. The column oven according to claim 6, wherein the column holding portion turns and the column inlet connection ports and the column outlet connection ports rotate as the support shaft rotates.

* * * * *